US006326773B1

United States Patent
Okuma et al.

(12) United States Patent
Okuma et al.

(10) Patent No.: US 6,326,773 B1
(45) Date of Patent: Dec. 4, 2001

(54) POWER CONVERSION APPARATUS

(75) Inventors: Yasuhiro Okuma; Kazuo Kuroki; Hiroshi Yamamoto, all of Kawasaki (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 09/533,727

(22) Filed: Mar. 23, 2000

(30) Foreign Application Priority Data

Mar. 24, 1999 (JP) .................................................. 11-078822

(51) Int. Cl.[7] .................................. G05F 3/00; H02J 3/00
(52) U.S. Cl. ................................................ 323/209; 363/34
(58) Field of Search ..................................... 323/209, 205, 323/207; 363/95, 97, 56, 98, 132, 40, 41

(56) References Cited

U.S. PATENT DOCUMENTS

| 4,651,265 | * | 3/1987 | Stacey et al. | .......................... 363/35 |
| 5,614,770 | * | 3/1997 | Suelzle | ................................. 307/105 |
| 6,118,676 | * | 9/2000 | Divan et al. | ............................ 363/34 |

* cited by examiner

Primary Examiner—Rajnikant Patel
(74) Attorney, Agent, or Firm—Venable; Robert J. Frank (57) ABSTRACT

A voltage amplitude adjuster including semiconductor switches for power conversion, an AC chopper for converting an input AC voltage to an AC voltage of the same phase and different amplitude relative to the input AC voltage, and a smoothing AC filter for providing a clear signal to a primary winding of a transformer. Further, by providing a wattmeter, the saved power can be displayed.

26 Claims, 11 Drawing Sheets

POWER CONVERSION APPARATUS

This application is based on Patent Application No. 11-078822 (1999) filed Mar. 24, 1999 in Japan, the content of which is incorporated hereinto by reference.

BACKGROUND OF THE INVENTION

1. Field of the Invention

The present invention relates to a power conversion apparatus which is able to adjust voltage of an electric power system for controlling voltage of a load connected to the power system thereby achieving a power-saving effect.

2. Description of the Related Art

In a prior art power conversion apparatus, for example, in a single-phase power supply, a method is used in which an autotransformer is provided with a plurality of taps.

Figure 11:
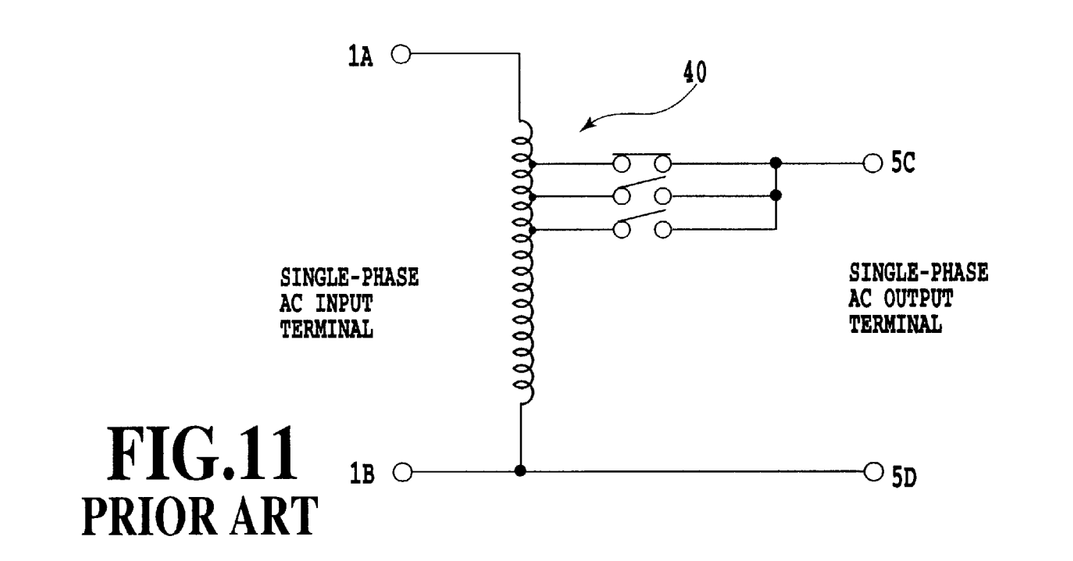
FIG. 11 is a circuit diagram showing a first prior art example of power-saving apparatus.

Here, as a first prior art, a circuit configuration of power-saving apparatus is shown in FIG. 11. In the circuit shown in FIG. 11, an inputted AC voltage at single-phase AC input terminals 1A and 1B is adjusted by changing over a tap 40 and outputted from single-phase AC output terminals 5C and 5D.

As shown above, since voltage control to the load is performed by tap change over, voltage control can be performed only at voltage levels of the number of previously provided taps, therefore, when a fine control is required, the number of taps has to be increased.

Figure 12:
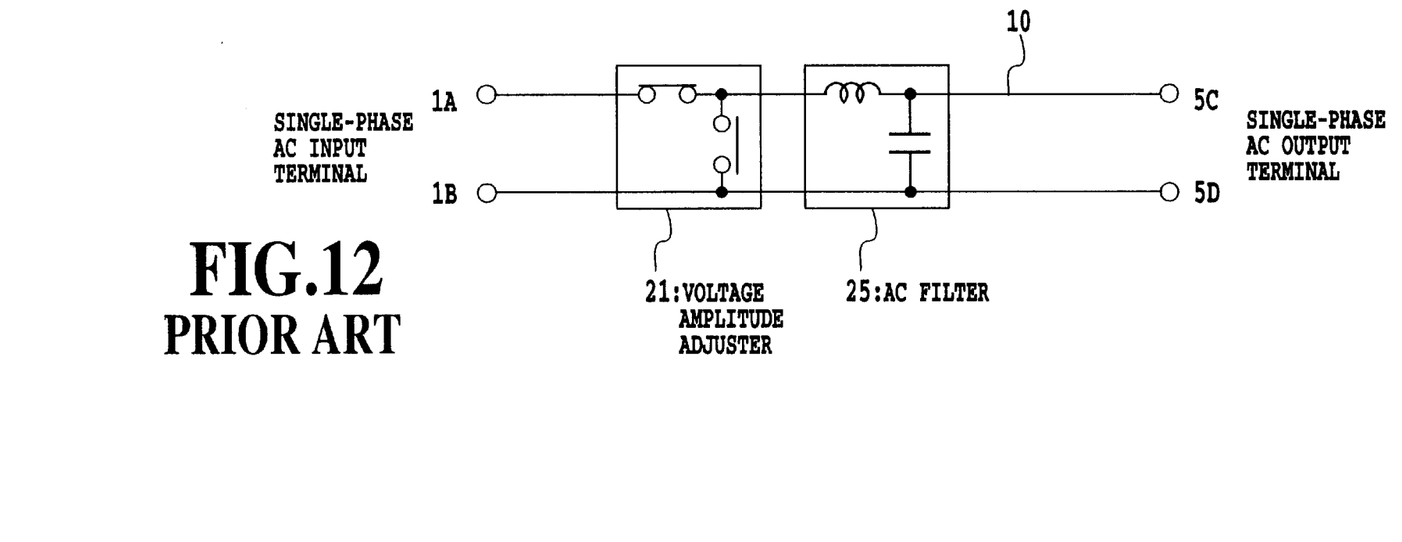
FIG. 12 is a circuit diagram showing a second prior art example of power-saving apparatus.

FIG. 12 shows a second prior art power-saving apparatus example which can solve the problem with the tap change-over control.

In the circuit shown in FIG. 12, the AC voltage inputted between the single-phase AC input terminals 1A and 1B is converted to a voltage of the same phase and differing in amplitude by a voltage amplitude adjuster 21 composed of semiconductor switches, then removed of ripples by an AC filter 25, and outputted from the single-phase AC output terminals 5C and 5D.

As shown above, AC voltage is controlled by ON/OFF operation of the semiconductor switches. Therefore, the AC voltage can always be maintained at a preset voltage.

Since, in the first prior art, voltage control has been performed by tap change over, there remain the following problems.

(1) Since the control capacity of output voltage is determined by the number of taps, to improve the accuracy of control, the number of taps is increased which results in a large-sized apparatus and a cost increase.

(2) When the taps are composed of mechanical contacts, it is necessary to consider the problem of service lives due to wear of the contacts, and an appropriate maintenance is required. Further, an instantaneous interruption or the like may occur during tap change over.

(3) Even if the tap is substituted with a thyristor, there still remains a problem of flicker or the like.

Further, since, in the second prior art, continuous voltage control by the semiconductor switches can be performed, the problems with voltage control by the tap change-over method can be solved, however, there is a problem that (4) a capacity of the conversion apparatus corresponding to the load power is required, which deteriorates the efficiency compared to the first prior art method, therefore, the desired power-saving effect can not be obtained.

SUMMARY OF THE INVENTION

It is therefore an object of the present invention to provide a power-saving apparatus which uses semiconductor switches to make it possible to continuously adjust voltage, reduce the converter capacity to one-several-tenth of the load capacity, and enhance the efficiency on the basis of power supply capacity, thereby obtaining a sufficient power-saving effect.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Preferred embodiments of the present invention will be described in detail with reference to the drawings as shown below.

<First Embodiment>

A first embodiment of the present invention will be described with reference to FIG. 1.

In a single-phase power system, input terminals of a voltage amplitude adjuster 21, which is a power conversion apparatus, a so-called AC chopper, for directly converting an input AC voltage to a voltage of the same phase and different amplitude relative to the input AC voltage and outputting an adjusted voltage are connected to single-phase AC input terminals 1A and 1B.

Output terminals of the voltage amplitude adjuster 21 are connected through an AC filter 25 to a primary winding 15 of a transformer 10 having two windings insulated from each other, and a secondary winding 16 of the transformer 10 is connected between the single-phase input terminal 1A and a single-phase AC output terminal 5C.

With the above configuration, single-phase AC voltage is converted by the voltage amplitude adjuster 21 to a voltage of the same phase and different amplitude relative to the input voltage, and filtered by the AC filter 25 into a sine wave voltage without ripples, which excites the primary winding 15 of the transformer 10 to output a voltage of one divided by the turn ratio.

At this time, by connecting the secondary winding 16 of the transformer 10 in a polarity to decrease the single-phase AC voltage, a voltage lower than the input voltage can be outputted to the single-phase AC output terminals, thereby supplying an appropriate voltage to load.

Further, since the conversion apparatus capacity is reduced to one divided by the turn ratio of the transformer 10, by decreasing a power loss in the power supply capacity for converting, efficiency of the entire system can be enhanced, obtaining a sufficient power-saving effect.

Still further, by connecting the secondary winding 16 of the transformer 10 in the backward polarity, it is also possible to increase the input voltage.

<Second Embodiment>

A second embodiment of the present invention will be described with reference to FIG. 2.

In a single-phase three-wire power system, input terminals of a voltage amplitude adjuster 21, which is a power conversion apparatus, a so-called AC chopper, for directly converting an input AC voltage to a voltage of the same phase and different amplitude relative to the input AC voltage and outputting an adjusted voltage are connected between single-phase three-wire AC input terminals 1R and 1T.

Output terminals of the voltage amplitude adjuster 21 are connected in parallel through an AC filter respectively to the primary winding 15 of the transformer 10 having two windings insulated from each other and to the primary winding 15 of a transformer 11 having two windings insulated from each other, the secondary winding 16 of the transformer 10 is connected in series between the single-phase three-wire AC input terminal 1R and a single-phase three-wire AC output terminal 5U, and the secondary winding 16 of the transformer 11 is connected in series between the single-phase three-wire AC input terminal 1T and a single-phase three-wire AC output terminal 5W.

With the above-described configuration, single-phase three-wire AC voltage is converted by the voltage amplitude adjuster 21 to a voltage of the same phase and different amplitude relative to the input voltage, and filtered by the AC filter 25 into a sine wave voltage without ripples, which excites the primary windings 15 of the transformers 10 and 11 to output a voltage divided by the turn ratio in the secondary windings 16 of the transformers 10 and 11.

At this time, by connecting the secondary windings 16 of the transformers 10 and 11 in a polarity to decrease the single-phase three-wire AC voltage, a voltage lower than the input voltage can be outputted to the single-phase three-wire AC output terminals, thereby supplying an appropriate voltage to the load and obtaining a power-saving effect.

<Third Embodiment>

Figure 3:
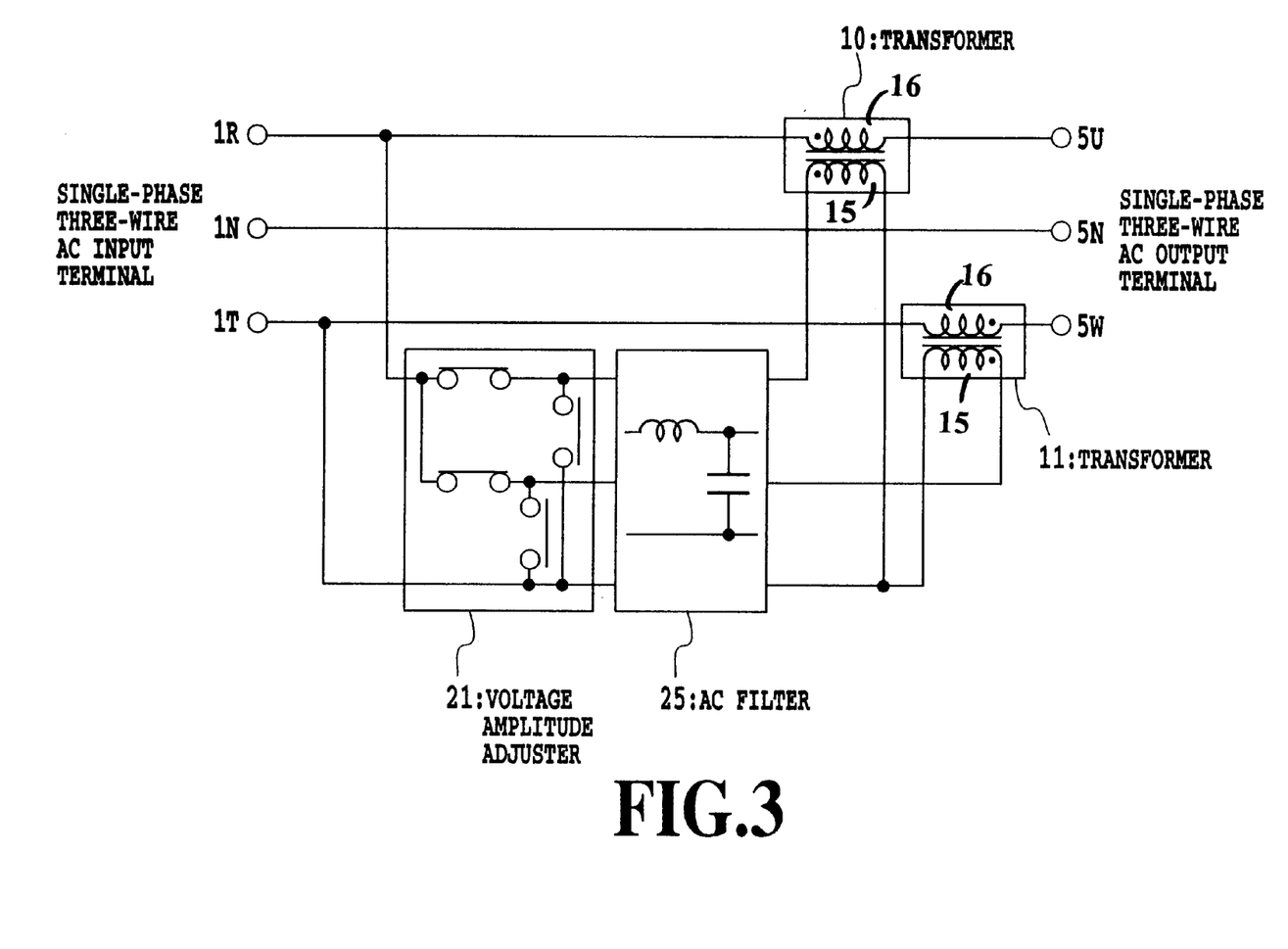
FIG. 3 is a circuit diagram showing a third embodiment of the power conversion apparatus according to the present invention.

A third embodiment of the present invention will be described with reference to FIG. 3.

In a single-phase three-wire power system, input terminals of a voltage amplitude adjuster 22, which is power conversion means, a so-called AC chopper, for directly converting an input AC voltage to two voltages of the same phase and different amplitude relative to the input AC voltage and outputting an adjusted voltage are connected between single-phase three-wire AC input terminals 1R and 1T.

Output terminals of the voltage amplitude adjuster 22 are connected through an AC filter 25 respectively to the primary winding 15 of the transformer 10 having two windings insulated from each other and to the primary winding 15 of a transformer 11 having two windings insulated from each other.

The secondary winding 16 of the transformer 10 is connected in series between the single-phase three-wire AC input terminal 1R and a single-phase three-wire AC output terminal 5U, and the secondary winding 16 of the transformer 11 is connected in series between the single-phase three-wire AC input terminal 1T and a single-phase three-wire AC output terminal 5W.

As a result, a sine wave of lower voltage than the input terminal side can be outputted at the single-phase three-wire AC output terminals, thereby supplying an appropriate voltage to the load and obtaining a power-saving effect.

In this method, in addition to the same effect as the second embodiment, even when a load is unbalanced, an effect is added to provide a voltage balance between the single-phase three-wire AC output terminals 5U–5N and between 5W–5N.

<Fourth Embodiment>

Figure 4:
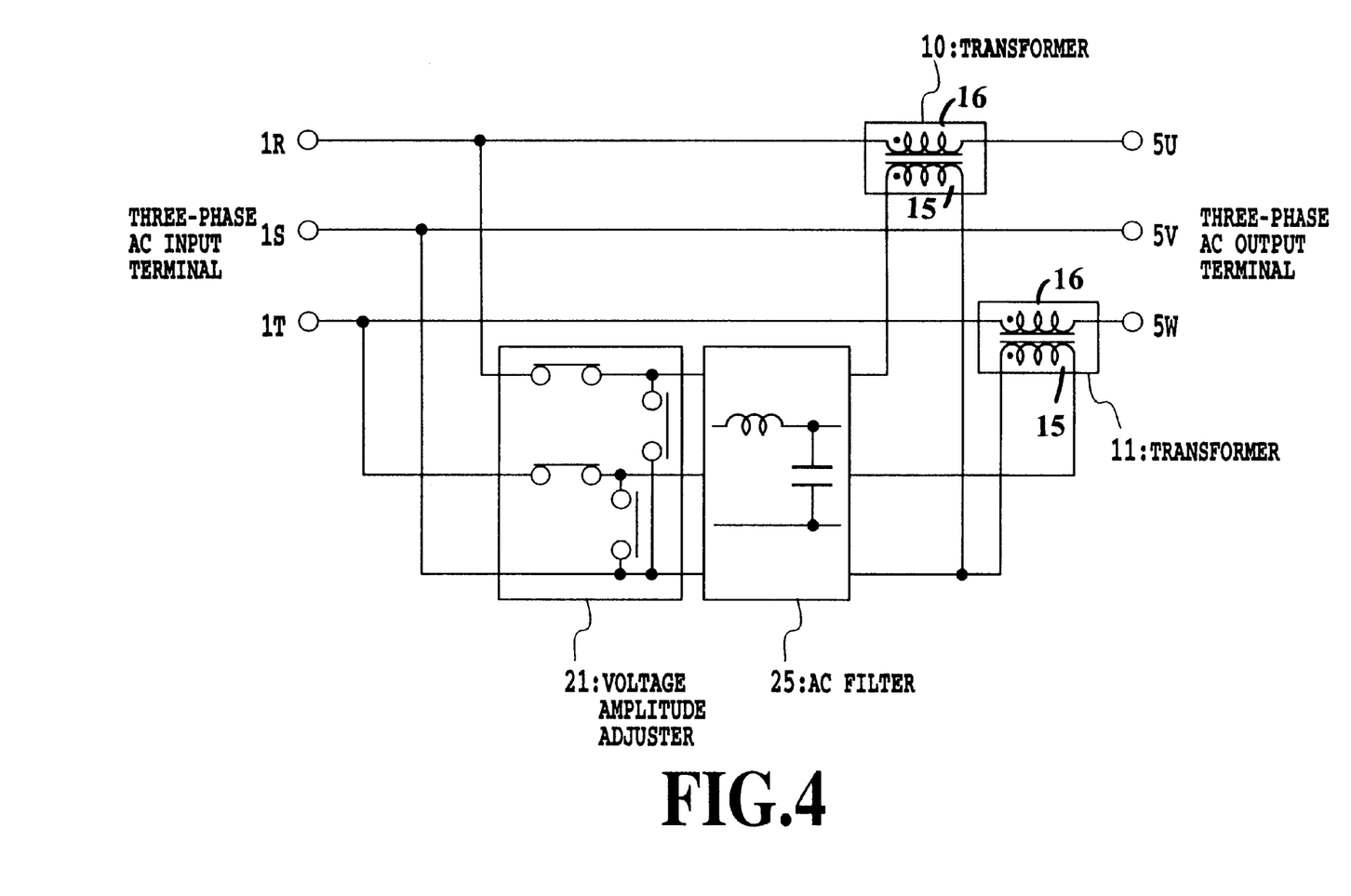
FIG. 4 is a circuit diagram showing a fourth embodiment of the power conversion apparatus according to the present invention.

A fourth embodiment of the present invention will be described with reference to FIG. 4.

In a three-phase power system, an input three-phase voltage is connected respectively to three-phase AC input terminals 1R, 1S and 1T so that one wire of three input terminals of a voltage amplitude adjuster 23 is an input/output common, which adjuster is power conversion means, a so-called AC chopper, for directly converting an input three-phase AC voltage to three-phase voltage of the same phase and different amplitude relative to the input three-phase AC voltage and outputting an adjusted voltage.

Among three output terminals of the voltage amplitude adjuster 23, the common of one wire and one of two remaining output terminals are connected through the AC filter 25 to the primary winding 15 of the transformer 10 having two windings insulated from each other.

One wire common line and the remaining one output terminal are connected through the AC filter 25 to the primary winding 15 of the transformer 11 having two windings insulated from each other.

The secondary winding 16 of the transformer 10 is connected in series between the three-phase AC input terminal 1R and the three-phase AC output terminal 5U, and the secondary winding 16 of the transformer 11 is connected in series between the three-phase AC input terminal 1T and the three-phase AC output terminal 5W.

With the above-described configuration, the voltage amplitude adjuster 23 performs amplitude adjustment with respect to the three-phase AC input terminal 1S to excite the transformers 10 and 11.

As a result, since the transformers 10 and 11 are connected in a polarity to decrease voltages between the three-phase AC input terminals 1R-1S and between the three-phase AC input terminals 1T-1S, voltages at the three-phase output end can be adjusted to appropriate voltages, thereby obtaining a power-saving effect.

Further, it is apparent that this circuit can be applied to a single-phase three-wire power supply by replacing the three-phase AC input terminal 1S with single-phase three-wire power supply terminal 1N.

Still further, improvement of efficiency and voltage increase by reversing the polarity of the transformer are the same as above-described respective aspects.

<Fifth Embodiment>

Figure 5:
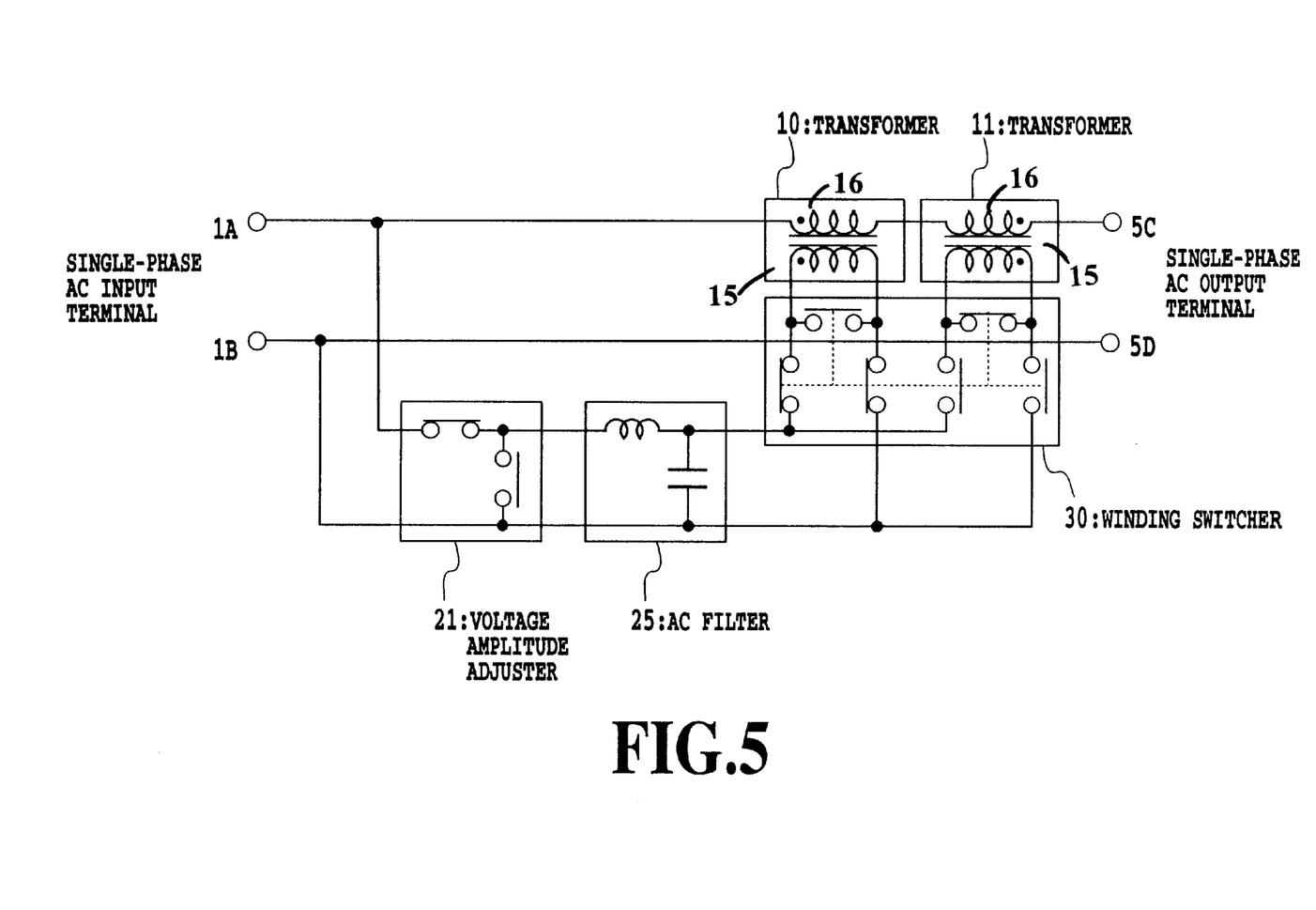
FIG. 5 is a circuit diagram showing a fifth embodiment of the power conversion apparatus according to the present invention.

A fifth embodiment of the present invention will be described with reference to FIG. 5.

In a single-phase power system, input terminals of a voltage amplitude adjuster 21, which is a power conversion apparatus, a so-called AC chopper, for directly converting an input AC voltage to an AC voltage of the same phase and different amplitude relative to the input AC voltage and outputting an adjusted voltage are connected between single-phase AC input terminals 1A and 1B.

Output terminals of the voltage amplitude adjuster 21 are connected through an AC filter 25 in parallel to respective primary windings 15 of the transformers 10 and 11 having two windings insulated from each other.

A winding switcher 30 for preventing simultaneous excitation of the respective transformers by the voltage conversion means of the voltage amplitude adjuster 21 is connected at the connection points of the connected AC filter and the transformers 10 and 11.

The secondary winding 16 of the transformer 10 is connected in a polarity to decrease the voltage and the secondary winding 16 of the transformer 11 is connected in a polarity to increase the voltage, respectively in series between the single-phase AC input terminal 1A and the single-phase AC output terminal 5C.

With the above-described configuration, since decreasing or increasing the input voltage can be simultaneously achieved by the addition of the winding switcher 30, and a constant voltage can be supplied even in a considerable drop of the input voltage, power-saving effect can always be obtained while satisfying a lowest voltage required by the load.

<Sixth Embodiment>

Figure 6:
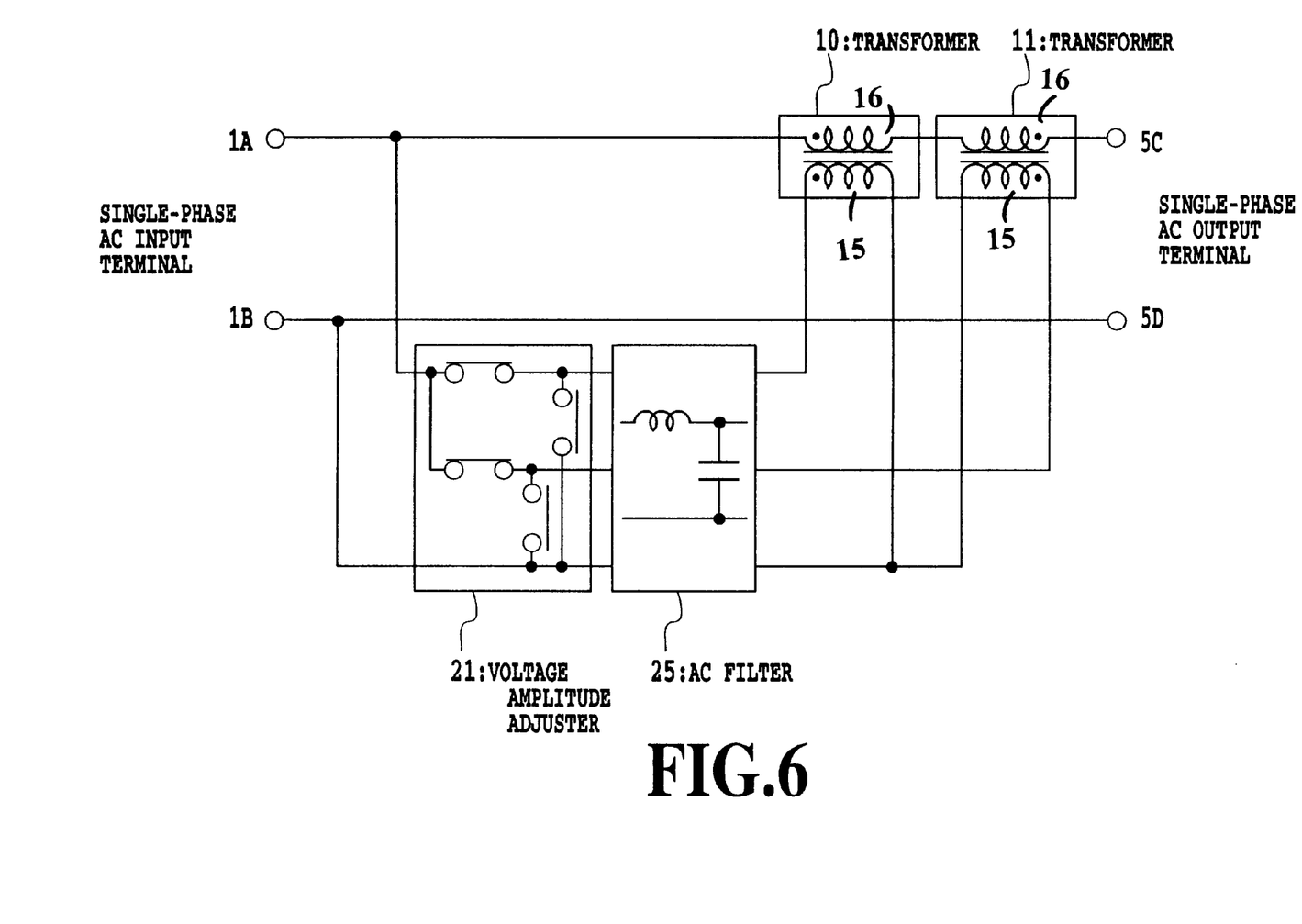
FIG. 6 is a circuit diagram showing a sixth embodiment of the power conversion apparatus according to the present invention.

A sixth embodiment of the present invention will be described with reference to FIG. 6.

In a single-phase power system, input terminals of a voltage amplitude adjuster 22, which is a power conversion apparatus, a so-called AC chopper, for directly converting an input AC voltage to an AC voltage of the same phase and different amplitude relative to the input AC voltage and outputting an adjusted voltage are connected between single-phase AC input terminals 1A and 1B.

Two output terminals of the voltage amplitude adjuster 22 are connected through an AC filter 25 to primary windings of the transformer 10 and 11.

The secondary winding 16 of the transformer 10 is connected in a polarity to decrease the single-phase AC input voltage, and the secondary winding 16 of the transformer 11 is connected to increase the single-phase AC input voltage, respectively between the single-phase AC input terminal 1A and the single-phase AC output terminal 5C.

With the above-described configuration, the same effect as the fifth aspect can be obtained even without using the winding switcher 30 in the fifth embodiment.

It can be easily anticipated that the fifth and sixth aspects can be applied in a single-phase three-wire power supply or a three-phase power supply.

<Seventh Embodiment>

A seventh embodiment of the present invention will be described with reference to FIG. 7.

Figure 1:
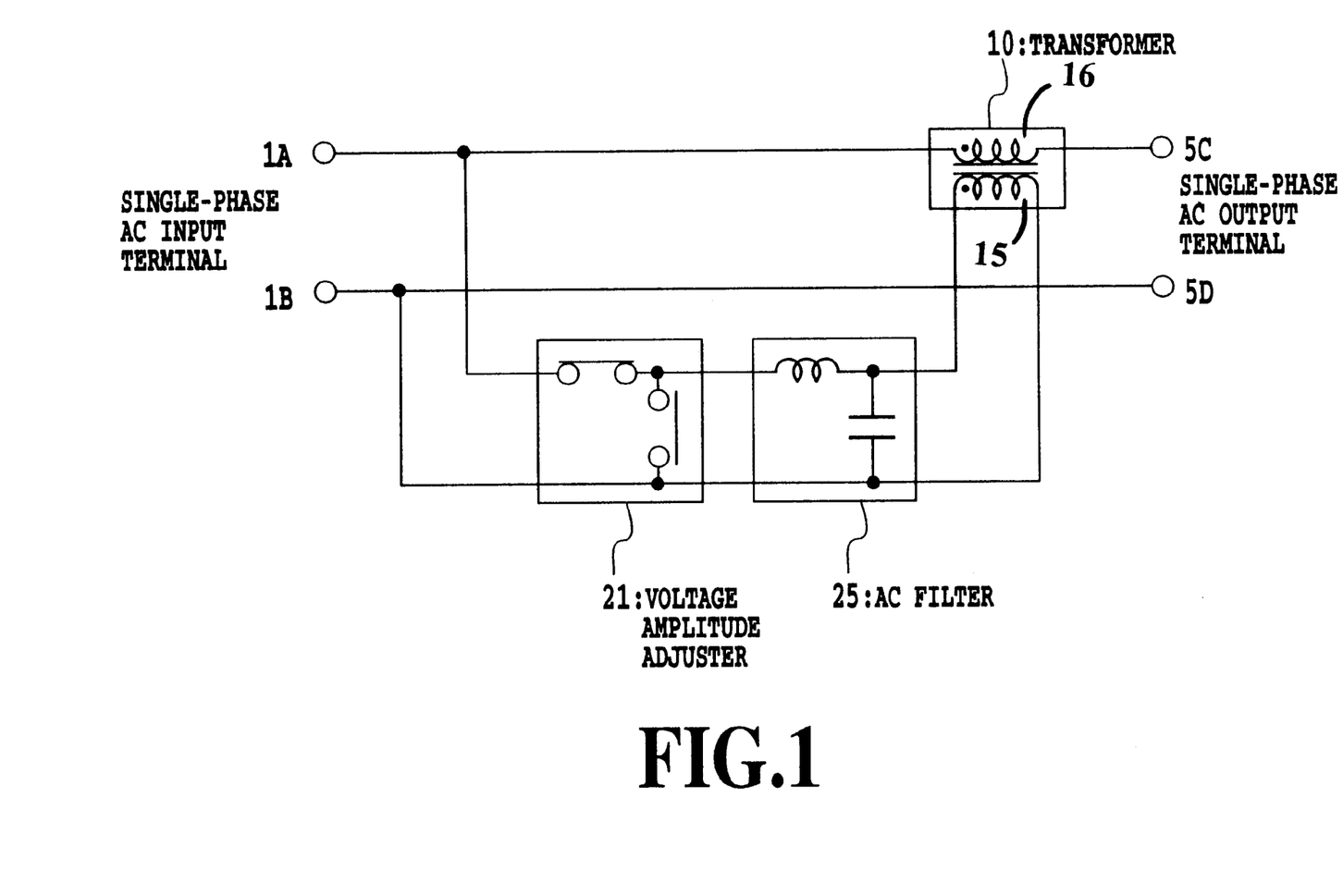
FIG. 1 is a circuit diagram showing a first embodiment of the power conversion apparatus according to the present invention.
Figure 7:
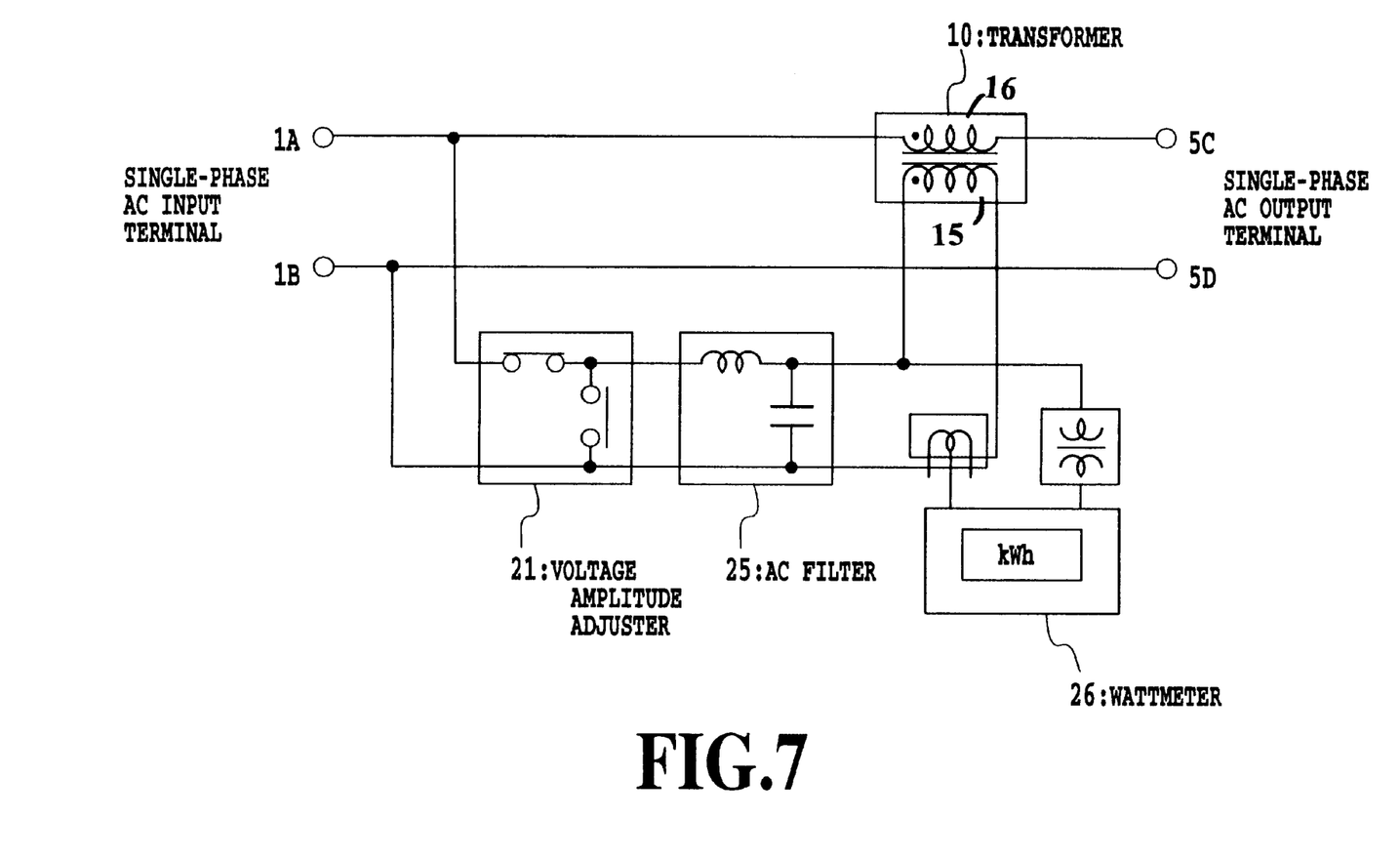
FIG. 7 is a circuit diagram showing a seventh embodiment of the power conversion apparatus provided with a wattmeter according to the present invention.

Configuration shown in FIG. 7 is based on the circuit in FIG. 1 connected with a wattmeter.

A wattmeter is connected between connection points of the primary winding of a transformer and an AC filter to be capable of indicating the amount of saving power. Here, when the turn ratio of the transformer is assumed to be n:1 as shown in FIG. 7, a load consumption power W1 when the power conversion apparatus of the present invention is not used is given as, where a load resistance is R, and an input voltage is $V_{in}$, $$W1 = V_{in}^2/R.$$

On the other hand, a load consumption W2 when the power conversion apparatus of the present invention is introduced is, where a load voltage is $V_{out}$ and a secondary voltage of the series transformer is Vt, $$W2 = V_{out}^2/R = (V_{in} - Vt)^2/R.$$

Since the saving power obtained by introducing the power conversion apparatus of the present invention is a difference between W1 and W2, $$\Delta W = W1 - W2 = (2V_{in} - Vt) \times Vt/R.$$

Further, in this case an electric power Ws supplied to the power supply by the power conversion apparatus of the present invention is, where a load current is Iout, $$Ws = (n \times Vt) \times (I_{out}/n) = Vt \times (V_{in} - Vt)/R.$$

Here, when the supply voltage of the power conversion apparatus of the present invention is increased by two times, since $$2 \times Ws = Vt \times (2 \times V_{in} - 2 \times Vt)/R,$$

2×Ws is decreased by $\Delta W - 2 \times Ws = Vt^2/R$ compared with $\Delta W$, however, since Vt is normally less than 10% of $V_{in}$, sufficiently small as compared with $V_{in}$, it is approximately negligible with respect to the saving power $\Delta W$.

From the above, by connecting the wattmeter so that the current detection sensitivity is increased by two times, it is possible to measure twice of Ws and display saving power of the power conversion apparatus approximately.

<Eighth Embodiment>

Figure 8:
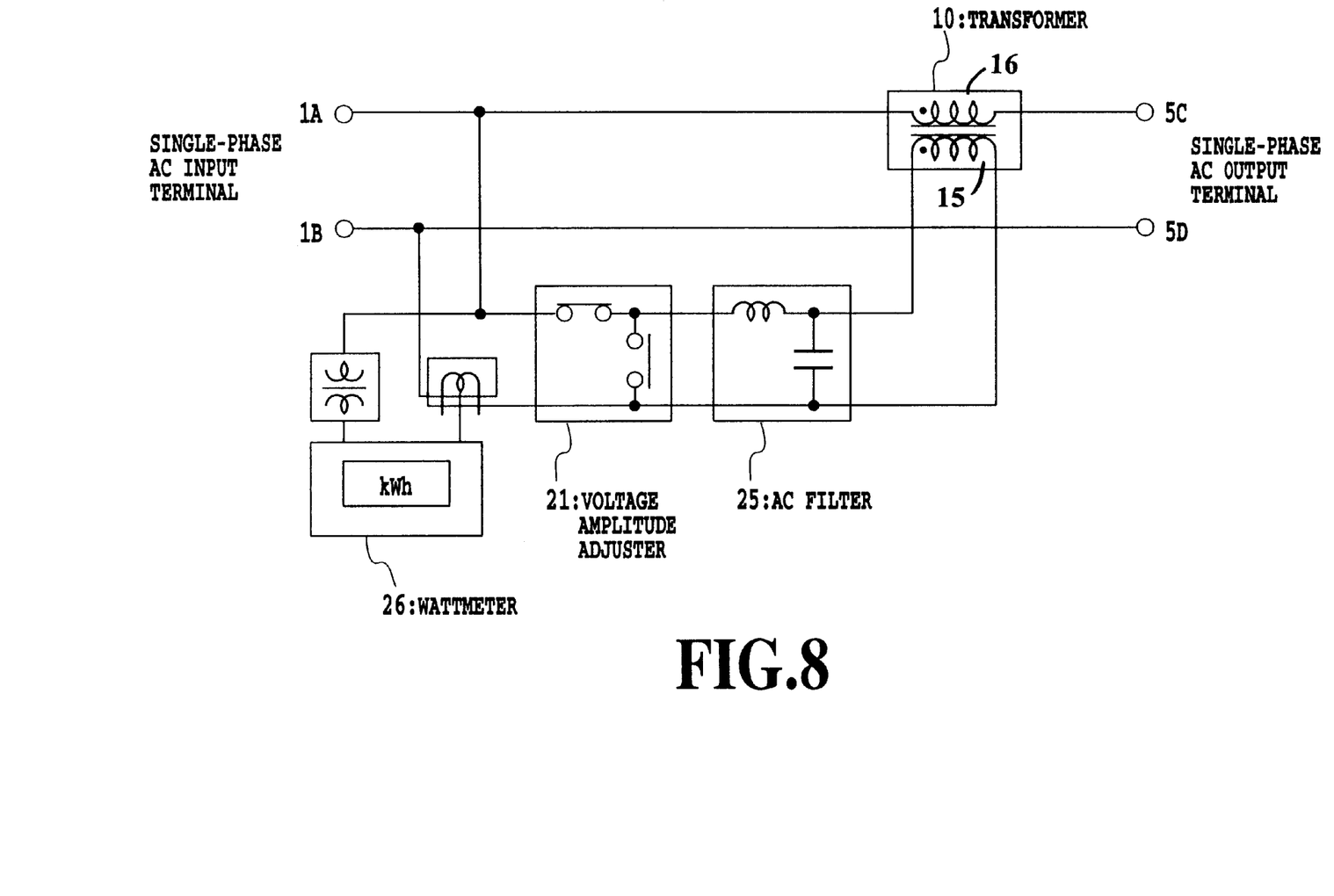
FIG. 8 is a circuit diagram showing an eighth embodiment of the power conversion apparatus provided with a wattmeter according to the present invention.

An eighth embodiment of the present invention will be described with reference to FIG. 8.

A difference thereof from the embodiment shown in FIG. 7 is that a wattmeter is connected between connection points of the power system and the voltage amplitude adjuster. In the present embodiment, saving power display is possible including a loss of the voltage amplitude adjuster which is power conversion means.

<Ninth Embodiment>

A ninth embodiment of the present invention will be described with reference to FIG. 9.

Figure 2:
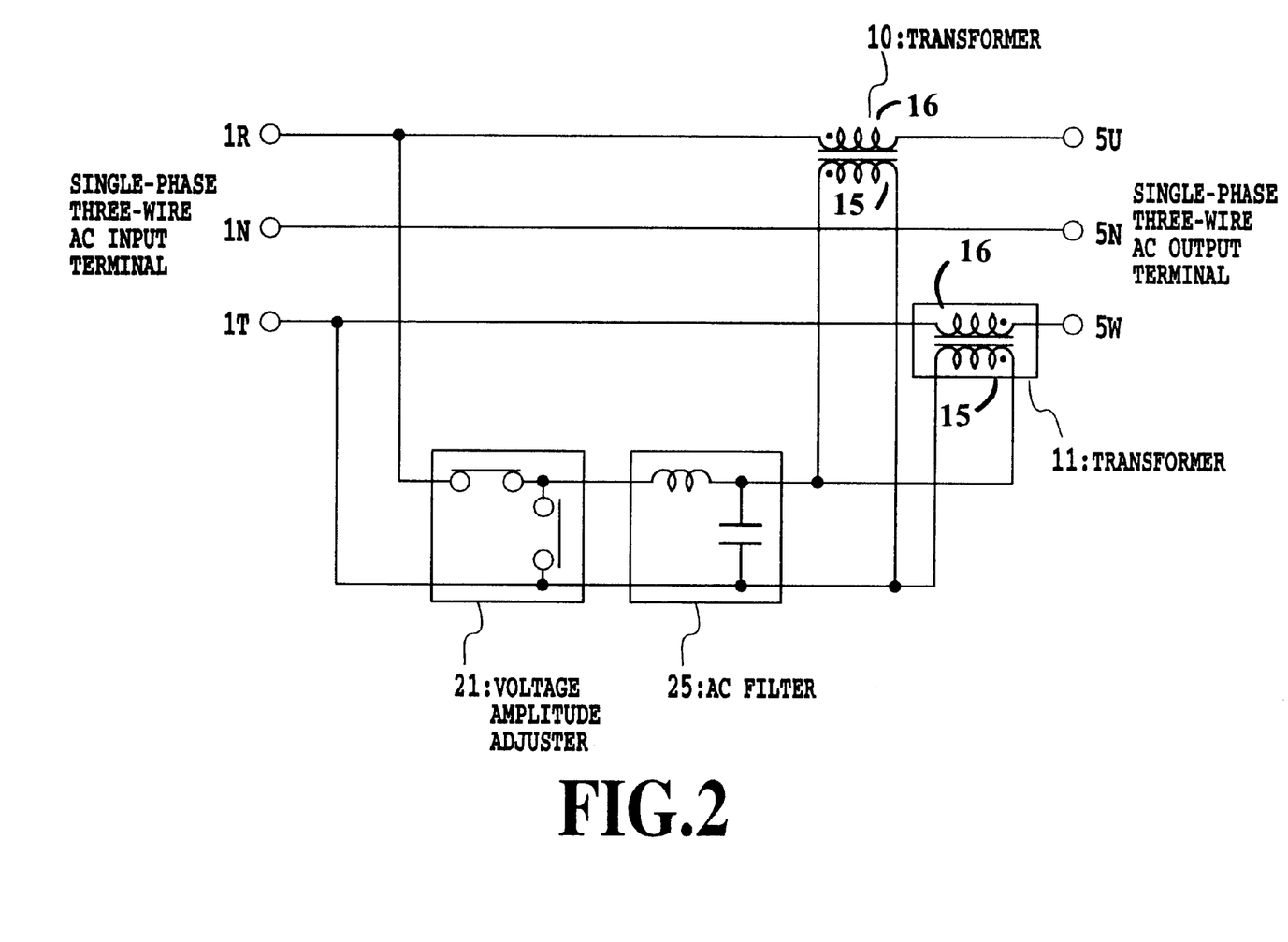
FIG. 2 is a circuit diagram showing a second embodiment of the power conversion apparatus according to the present invention.

The present embodiment is based on the second embodiment shown in FIG. 2, wherein a wattmeter is connected.

Figure 9:
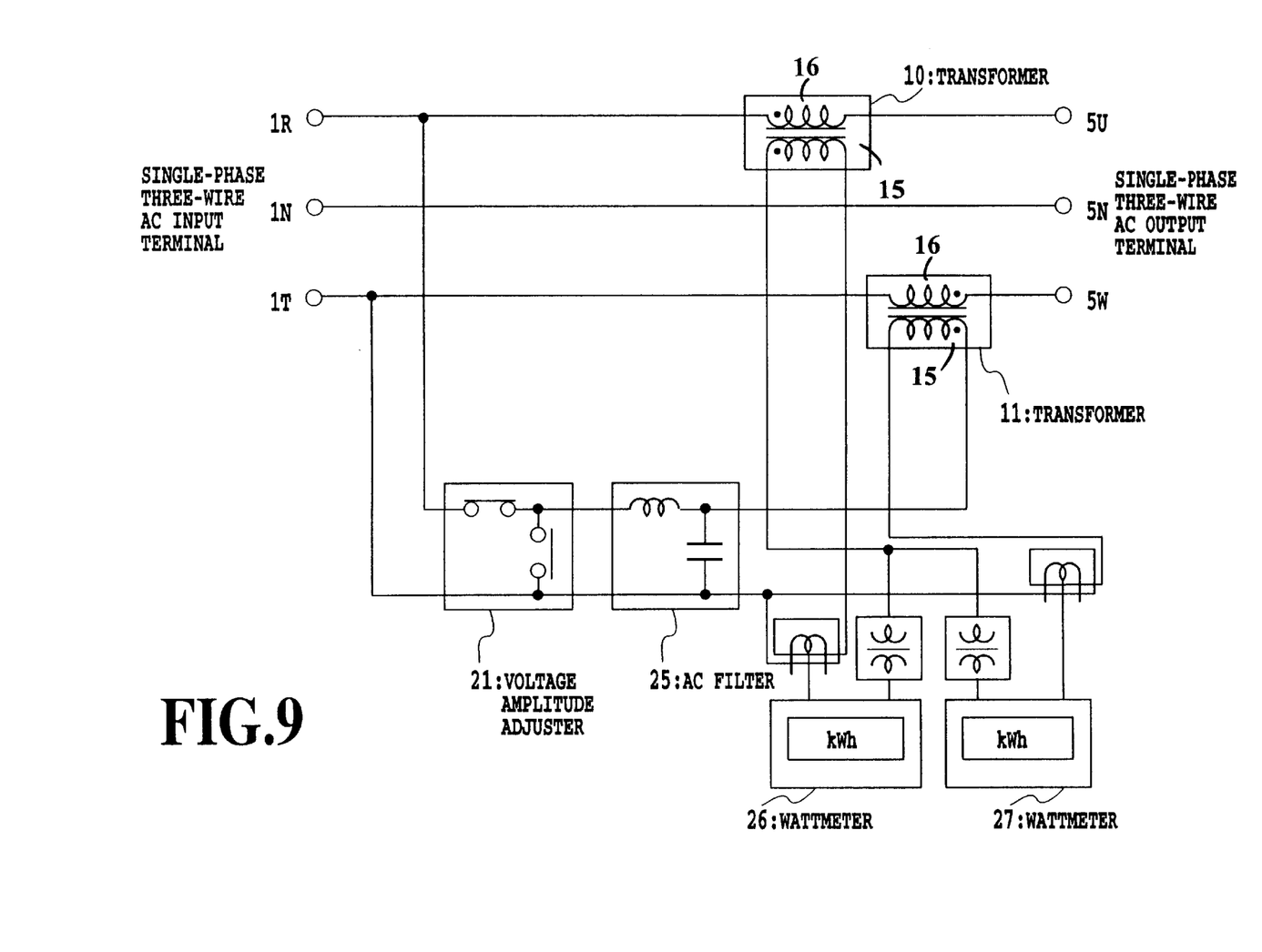
FIG. 9 is a circuit diagram showing a ninth embodiment of the power conversion apparatus provided with a wattmeter according to the present invention.

In FIG. 9, between the primary winding of the transformer 10 and the AC filter 25, a voltage detection part of a wattmeter 1 is connected in parallel, and a current detection part is connected in series and so that the current detection sensitivity is increased by two times.

A voltage detection part of a wattmeter 2 is connected in parallel between connection points of the primary winding of the transformer 11 and the AC filter 25, and a current detection part thereof is connected in series and so that the current detection sensitivity is increased by two times.

With the above configuration, electric energies displayed by the wattmeters 1 and 2 indicate saving powers to respective connected loads. Therefore, the sum of the display results of the two wattmeters is the saved power.

Further, it is obvious that when using a single wattmeter and the current detection part is connected at a position where a resultant current of the transformers 10 and 11 can be measured, a total of consumption power of the connected load can be displayed.

<Tenth Embodiment>

Figure 10:
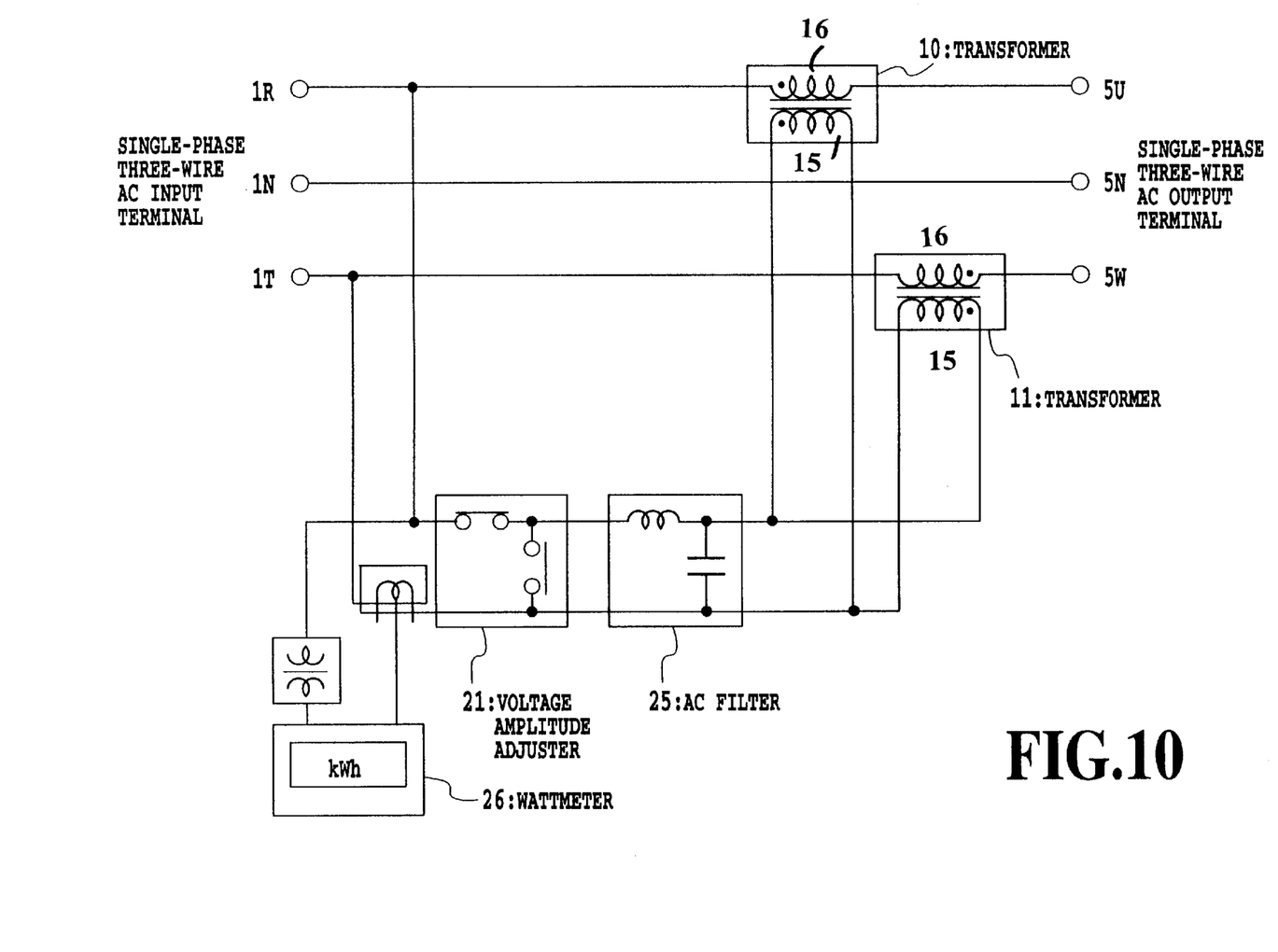
FIG. 10 is a circuit diagram showing a tenth embodiment of the power conversion apparatus provided with a wattmeter according to the present invention.

A tenth embodiment of the present invention will be described with reference to FIG. 10.

A difference thereof from the embodiment in FIG. 9 is that a single wattmeter is connected between connection points of the power system and the voltage amplitude adjuster.

In the present embodiment, since the wattmeter 1 is connected between connection points of the power system and the voltage amplitude adjuster, indications of the two wattmeters used in FIG. 9 can be displayed by a single wattmeter, and saving power display is possible including a loss of the power conversion means.

According to the present invention, in respective single-phase, single-phase three-wire, an three-phase power supply system, since output of the voltage amplitude adjuster composed of semiconductor switches is added to (or subtracted from) the system through the transformers to adjust the output voltage, obtaining an appropriate voltage value of the output voltage for the load while satisfying high efficiency in a condition possible of high-speed response.

Therefore, consumption of excessive power is suppressed to save the consumption power cost, resulting in a high power-saving effect.

Further, according to the present invention, saving power is made displayable to make the power-saving effect directly visible.

Still further, according to the present invention, saved power can be displayed including a power conversion loss of the power conversion means (voltage amplitude adjuster).

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A power conversion apparatus for adjusting a power inputted from a power system and outputting it to a load, comprising:

power input terminal connected to a single-phase power system;

power output terminal connected to a load;

power conversion means, composed of semiconductor switches, for adjusting an input AC voltage inputted from said power input terminal to a voltage of the same phase and different amplitude relative to said input AC voltage and outputting an adjusted voltage;

a filter for smoothing said adjusted voltage outputted from said power conversion means; and a transformer having a primary winding inputted with said adjusted voltage smoothed by said filter and having a secondary winding insulated with respect to said primary winding, wherein:

said secondary winding of said transformer is connected in series between said power input terminal of said power system and said power output terminal, input side of said power conversion means is connected in parallel to said power input terminal of said power system, and output side of said power conversion means is connected through said filter to said primary winding of said transformer, wherein said connection of the secondary winding of said transformer in a polarity is registered so that said input AC voltage is lowered by adding an output voltage of said power conversion means outputted from the secondary winding of said transformer and the lowered voltage is provided to the output terminal.

2. A power conversion apparatus for adjusting a power inputted from a power system and outputting it to a load, comprising:

power input terminal connected to a single-phase three-wire power system;

power output terminal connected to a load;

power conversion means, composed of semiconductor switches, for adjusting an input AC voltage inputted from said power input terminal to a voltage of the same phase and different amplitude relative to said input AC voltage and outputting an adjusted voltage;

a filter for smoothing said adjusted voltage outputted from said power conversion means; and first and second transformers having a primary winding inputted with said adjusted voltage smoothed by said filter and having a secondary winding insulated with respect to said primary winding, wherein:

said secondary winding of said first transformer is connected in series between said power input terminal as one wire of said power system and said power output terminal, said secondary winding of said second transformer is connected in series between said power input terminal as one of two remaining wires of said power system and said power output terminal, input side of said power conversion means is connected in parallel between power input terminals of two wires of said power system, and output side of said power conversion means is connected through said filter respectively in parallel to said primary windings of said first and second transformers, wherein said connection of the secondary winding of said transformer in a polarity is registered so that said input AC voltage is lowered by adding an output voltage of said power conversion means outputted from the secondary winding of said transformer and the lowered voltage is provided to the output terminal.

3. A power conversion apparatus for adjusting a power inputted from a power system and outputting it to a load, comprising:

power input terminal connected to a single-phase three-wire power system;

power output terminal connected to a load;

power conversion means, composed of semiconductor switches, for adjusting an input AC voltage inputted from said power input terminal to a voltage of the same phase and different amplitude relative to said input AC voltage and outputting an adjusted voltage;

a filter for smoothing said adjusted voltage outputted from said power conversion means; and first and second transformers having a primary winding inputted with said adjusted voltage smoothed by said filter and having a secondary winding insulated with respect to said primary winding, wherein said secondary winding of said first transformer is connected in series between said power input terminal as one wire of said power system and said power output terminal, said secondary winding of said second transformer is connected in series between said power input terminal as one of two remaining wires of said power system and said power output terminal, input side of said power conversion means is connected in parallel between said power input terminals of two wires of said power system, one output side of said power conversion means is connected through said filter to said primary winding of said first transformer, and the other output side of said power conversion means is connected through said filter to said primary winding of said second transformer, wherein said connection of the secondary winding of said transformer in a polarity is registered so that said input AC voltage is lowered by adding an output voltage of said power conversion means outputted from the secondary winding of said transformer and the lowered voltage is provided to the output terminal.

4. A power conversion apparatus for adjusting a power inputted from a power system and outputting it to a load, comprising:

power input terminal connected to a three-phase power system;

power output terminal connected to a load;

power conversion means, composed of semiconductor switches, for adjusting an input AC voltage inputted from said power input terminal to a voltage of the same phase and different amplitude relative to said input AC voltage and outputting an adjusted voltage;

a filter for smoothing said adjusted voltage outputted from said power conversion means; and first and second transformers having a primary winding inputted with said adjusted voltage smoothed by said filter and having a secondary winding insulated with respect to said primary winding, wherein:

said secondary winding of said first transformer is connected in series between said power input terminal as one wire other than a common line of said power system and said power output terminal, said secondary winding of said second transformer is connected in series between said power input terminal as one remaining wire other than said common line of said power system and said power output terminal, input side of said power conversion means is connected in parallel to said power input terminals of said power system, among three output terminals of said power conversion means, terminal of said common line and one terminal of remaining two terminals are connected through said filter to said primary winding of said first transformer, and among three output terminals of said power conversion means, terminal of said common line and remaining one terminal are connected through said filter to said primary winding of said second transformer, wherein said connection of the secondary winding of said transformer in a polarity is registered so that said input AC voltage is lowered by adding an output voltage of said power conversion means outputted from the secondary winding of said transformer and the lowered voltage is provided to the output terminal.

5. A power conversion apparatus for adjusting a power inputted from a power system and outputting it to a load, comprising:

power input terminal connected to a single-phase power system;

power output terminal connected to a load;

power conversion means, composed of semiconductor switches, for adjusting an input AC voltage inputted from said power input terminal to a voltage of the same phase and different amplitude relative to said input AC voltage and outputting an adjusted voltage;

a filter for smoothing said adjusted voltage outputted from said power conversion means; and first and second transformers having a primary winding inputted with said adjusted voltage smoothed by said filter and having a secondary winding insulated with respect to said primary winding, wherein:

said secondary windings of said first and second transformers are connected in series between said power input terminal as one wire of said power system and said power output terminal, input side of said power conversion means is connected in parallel to said power input terminal of said power system, output side of said power conversion means is connected through said filter in parallel to said primary windings of said first and second transformers, and transformer switching means for preventing simultaneous excitation of said first and second transformers by said power conversion means is connected between connection points of said filter and said first and second transformers, wherein said connection of the secondary winding of said first transformer is connected in a polarity which decreases the input AC voltage and the secondary winding of said second transformer is connected in a polarity which increases the AC voltage.

6. A power conversion apparatus for adjusting a power inputted from a power system and outputting it to a load, comprising:

power input terminal connected to a single-phase power system;

power output terminal connected to a load;

power conversion means, composed of semiconductor switches, for adjusting an input AC voltage inputted from said power input terminal to a voltage of the same phase and different amplitude relative to said input AC voltage and outputting an adjusted voltage;

a filter for smoothing said adjusted voltage outputted from said power conversion means; and first and second transformers having a primary winding inputted with said adjusted voltage smoothed by said filter and having a secondary winding insulated with respect to said primary winding, wherein:

said secondary windings of said first and second transformers are connected in series between said power input terminal as one wire of said power system and said power output terminal, and said first and second transformers are connected in reverse polarity to each other, input side of said power conversion means is connected in parallel to said power input terminal of said power system, one output side of said power conversion means is connected through said filter to said primary winding of said first transformer, the other output side of said power conversion means is connected through said filter to said primary winding of said second transformer, wherein said connection of the secondary winding of said transformer in a polarity is registered so that said input AC voltage is lowered by adding an output voltage of said power conversion means outputted from the secondary winding of said transformer and the lowered voltage is provided to the output terminal.

7. The power conversion apparatus as claimed in claim 1, wherein a wattmeter is connected between said primary winding of said transformer and said filter.

8. The power conversion apparatus as claimed in claim 1, wherein a wattmeter is connected between said power input terminal connected with said power system and said power conversion means.

9. The power conversion apparatus as claimed in claim 7, wherein said wattmeter is connected so that a current detection sensitivity of said wattmeter is increased by two times.

10. The power conversion apparatus as claimed in claim 8, wherein said wattmeter is connected so that a current detection sensitivity of said wattmeter is increased by two times.

11. The power conversion apparatus as claimed in claim 2, wherein a wattmeter is connected between said primary winding of said transformer and said filter.

12. The power conversion apparatus as claimed in claim 3, wherein a wattmeter is connected between said primary winding of said transformer and said filter.

13. The power conversion apparatus as claimed in claim 4, wherein a wattmeter is connected between said primary winding of said transformer and said filter.

14. The power conversion apparatus as claimed in claim 5, wherein a wattmeter is connected between said primary winding of said transformer and said filter.

15. The power conversion apparatus as claimed in claim 6, wherein a wattmeter is connected between said primary winding of said transformer and said filter.

16. The power conversion apparatus as claimed in claim 2, wherein a wattmeter is connected between said power input terminal connected with said power system and said power conversion means.

17. The power conversion apparatus as claimed in claim 3, wherein a wattmeter is connected between said power input terminal connected with said power system and said power conversion means.

18. The power conversion apparatus as claimed in claim 4, wherein a wattmeter is connected between said power input terminal connected with said power system and said power conversion means.

19. The power conversion apparatus as claimed in claim 5, wherein a wattmeter is connected between said power input terminal connected with said power system and said power conversion means.

20. The power conversion apparatus as claimed in claim 6, wherein a wattmeter is connected between said power input terminal connected with said power system and said power conversion means.

21. A power conversion apparatus for adjusting power inputted from a power system and outputting the adjusted power to a load, comprising:

power input terminals for receiving power from a single-phase power system, an alternating input voltage being applied by said power system across said input terminals;

power output terminals for delivering power to the load, an alternating output voltage being produced across said output terminals;

power conversion means coupled across said power input terminals, said power conversion means continuously converting said alternating input voltage to an adjusted voltage having the same phase as said input voltage and an amplitude differing therefrom;

a filter coupled to said power conversion means for receiving said adjusted voltage, said filter smoothing said adjusted voltage and outputting a filtered adjusted voltage; and a transformer having a primary winding and a secondary winding insulated from said primary winding, said primary winding being connected to the output of said filter to receive said filtered adjusted voltage, said secondary winding being connected in series between one of said power input terminals and a corresponding power output terminal so that all of the current flowing between said power input terminal and said corresponding power output terminal flows continuously through said secondary winding, and wherein the polarity of said secondary winding relative to the polarity of said primary winding is selected to generate a voltage across said secondary winding which is subtracted from said input voltage to produce an output voltage across said power output terminals having a magnitude less than that of the voltage across said input terminals, whereby power extracted from said power system is reduced.

22. A power conversion apparatus for adjusting power inputted from a power system and outputting the adjusted power to a load, comprising:

three power input terminals for receiving power from a single-phase three-wire power system, alternating input voltages being applied by said power system across said input terminals;

three power output terminals for delivering power to the load, alternating output voltages being produced across said output terminals;

power conversion means coupled across two of said three power input terminals, said power conversion means continuously converting said alternating input voltage to an adjusted voltage having the same phase as the voltage across said two power input terminals and an amplitude differing therefrom;

a filter coupled to said power conversion means for receiving said adjusted voltage, said filter smoothing said adjusted voltage and outputting a filtered adjusted voltage; and first and second transformers, each of said transformers having a primary winding and a secondary winding insulated from said primary winding, the primary windings of said first and second transformers receiving said filtered adjusted voltage, the secondary winding of said first transformer being connected in series between one of said power input terminals and a corresponding one of said power output terminals so that all of the current flowing between said one power input terminal and said corresponding power output terminal flows continuously through the secondary winding of said first transformer, the secondary winding of said second transformer being connected in series between another of said power input terminals and a corresponding another of said power output terminals so that all of the current flowing between said another of said power input terminals and said corresponding another of said power output terminals flows continuously through the secondary winding of said second transformer, and wherein in each of said first and second transformers the polarity of the secondary winding relative to the polarity of the primary winding is selected to generate a voltage across the secondary winding which is subtracted from said input voltage to produce an output voltage across said power output terminals having a magnitude less than that of the voltage across said input terminals, whereby power extracted from said power system is reduced.

23. A power conversion apparatus for adjusting power inputted from a power system and outputting the adjusted power to a load, comprising:

three power input terminals for receiving power from a single-phase three-wire power system, alternating input voltages being applied by said power system across said input terminals;

three power output terminals for delivering power to the load, alternating output voltages being produced across said output terminals;

power conversion means coupled across two of said three power input terminals, said power conversion means continuously converting said alternating input voltage to first and second adjusted voltages, each of said first and second adjusted voltages having the same phase as the voltage across said two power input terminals and an amplitude differing therefrom;

a filter coupled to said power conversion means for receiving said first and second adjusted voltages, said filter smoothing said adjusted voltages and outputting first and second filtered adjusted voltage; and first and second transformers, each of said transformers having a primary winding and a secondary winding insulated from said primary winding, the primary winding of said first and second transformers receiving said first and second filtered adjusted voltages respectively, the secondary winding of said first transformer being connected in series between one of said power input terminals and a corresponding one of said power output terminals so that all of the current flowing between said one power input terminal and said corresponding power output terminal flows continuously through the secondary winding of said first transformer, the secondary winding of said second transformer being connected in series between another of said power input terminals and a corresponding another of said power output terminals so that all of the current flowing between said another of said power input terminals and said corresponding another of said power output terminals flows continuously through the secondary winding of said second transformer, and wherein in each of said first and second transformers the polarity of the secondary winding relative to the polarity of the primary winding is selected to generate a voltage across the secondary winding which is subtracted from said input voltage to produce an output voltage across said power output terminals having a magnitude less than that of the voltage across said input terminals, whereby power extracted from said power system is reduced.

24. A power conversion apparatus for adjusting power inputted from a power system and outputting the adjusted power to a load, comprising:

first, second and common power input terminals for receiving power from a three-phase power system having a common line connected to the common power input terminal, a three-phase alternating input voltage being applied by said power system across said power input terminals;

first, second and common power output terminals for delivering power to the load, said common power output terminal being connected to said common power input terminal, a three-phase alternating output voltages being produced across said power output terminals;

power conversion means coupled across said first, second and common power input terminals, said power conversion means continuously converting the three-phase alternating input voltage to a three-phase adjusted voltage applied across first, second and common adjusted voltage output terminals, the common adjusted voltage output terminal being connected to the common line of said three-phase power system, said three phase adjusted voltage having the same phase relationships as the three-phase alternating input voltage and amplitudes differing therefrom;

a filter coupled to said power conversion means, said filter smoothing said three-phase adjusted voltage and being provided with first, second and common filter output terminals, said common filter output terminal being connected to the common line of said three-phase power system; and first and second transformers, each of said transformers having a primary winding and a secondary winding insulated from said primary winding, the primary winding of said first transformer being connected across the first and common output filter terminals and the primary winding of said second transformer being connected across the third and common filter output terminals, the secondary winding of said first transformer being connected in series between said first power input terminal and said first power output terminal so that all of the current flowing between said first power input terminal and said first power output terminal flows continuously through the secondary winding of said first transformer, the secondary winding of said second transformer being connected in series between the third power input terminal and the third power output terminal so that all of the current flowing between said third power input terminal and said third power output terminals flows continuously through the secondary winding of said second transformer, and wherein in each of said first and second transformers the polarity of the secondary winding relative to the polarity of the primary winding is selected to generate a voltage across the secondary winding which is subtracted from said input voltage to produce an output voltage across said power output terminals having a magnitude less than that of the voltage across said input terminals, whereby power extracted from said power system is reduced.

25. A power conversion apparatus for adjusting power inputted from a power system and outputting the adjusted power to a load, comprising:

power input terminals for receiving power from a single-phase power system, an alternating input voltage being applied by said power system across said input terminals;

power output terminals for delivering power to the load, an alternating output voltage being produced across said output terminals;

power conversion means coupled across said power input terminals, said power conversion means continuously converting said alternating input voltage to an adjusted voltage having the same phase as said input voltage and an amplitude differing therefrom;

a filter coupled to said power conversion means for receiving said adjusted voltage, said filter smoothing said adjusted voltage and outputting a filtered adjusted voltage;

first and second transformers, each of said transformers having a primary winding and a secondary winding insulated from said primary winding, the secondary windings of said first and second transformers being connected in series between one of said power input terminals and a corresponding one of said power output terminals so that all of the current flowing between said one power input terminal and said corresponding power output terminal flows continuously through the secondary windings of said first and second transformers, and wherein in said first transformer the polarity of the secondary winding relative to the polarity of the primary winding is selected to generate a voltage across the secondary winding which is subtracted from said input voltage to produce an output voltage across said power output terminals having a magnitude less than that of the voltage across said input terminals, and wherein in said second transformer the polarity of the secondary winding relative to the polarity of the primary winding is selected to generate a voltage across the secondary winding which is added to said input voltage to produce an output voltage across said power output terminals having a magnitude which is greater than that of the voltage across said input terminals, and transformer switching means coupling the primary windings of said first and second transformers to the output of said filter, said transformer switching means being operable to switch either the primary winding of said first transformer or the primary winding of said second transformer to the output of said filter so that only one of said primary windings receives said filtered adjusted voltage at a time.

26. A power conversion apparatus for adjusting power inputted from a power system and outputting the adjusted power to a load, comprising:

power input terminals for receiving power from a single-phase power system, an alternating input voltage being applied by said power system across said input terminals;

power output terminals for delivering power to the load, an alternating output voltage being produced across said output terminals;

power conversion means coupled across said power input terminals, said power conversion means continuously converting said alternating input voltage to first and second adjusted voltages, each of said first and second adjusted voltages having the same phase as the voltage across said power input terminals and an amplitude differing therefrom;

a filter coupled to said power conversion means for receiving said first and second adjusted voltages, said filter smoothing said adjusted voltages and outputting first and second filtered adjusted voltage; and first and second transformers, each of said transformers having a primary winding and a secondary winding insulated from said primary winding, the primary winding of said first and second transformers being connected to said filter to receive said first and second filtered adjusted voltages respectively, the secondary windings of said first and second transformers being connected in series between one of said power input terminals and a corresponding one of said power output terminals so that all of the current flowing between said one power input terminal and said corresponding power output terminal flows continuously through the secondary windings of said first and second transformers, and wherein in said first transformer the polarity of the secondary winding relative to the polarity of the primary winding is selected to generate a voltage across the secondary winding which is subtracted from said input voltage to produce an output voltage across said power output terminals having a magnitude less than that of the voltage across said input terminals, and wherein in said second transformer the polarity of the secondary winding relative to the polarity of the primary winding is selected to generate a voltage across the secondary winding which is added to said input voltage to produce an output voltage across said power output terminals having a magnitude which is greater than that of the voltage across said input terminals.

\* \* \* \* \*